US012750158B2

(12) United States Patent
Dey et al.

(10) Patent No.: US 12,750,158 B2
(45) Date of Patent: Sep. 29, 2026

(54) EXTENDED REALITY AGGREGATOR LOW LATENCY ROBUST ERROR RECOVERY

(71) Applicant: QUALCOMM Incorporated, San Diego, CA (US)

(72) Inventors: Abhijeet Dey, Bengaluru (IN); Wesley James Holland, Encinitas, CA (US); Joby Abraham, Bangalore (IN); Vijayamanohar Nagarajan, Bangalore (IN)

(73) Assignee: QUALCOMM Incorporated, San Diego, CA (US)

( * ) Notice: Subject to any disclaimer, the term of this patent is extended or adjusted under 35 U.S.C. 154(b) by 38 days.

(21) Appl. No.: 18/352,510

(22) Filed: Jul. 14, 2023

(65) Prior Publication Data

US 2025/0023659 A1 Jan. 16, 2025

(51) Int. Cl.
*H04L 1/00* (2006.01)

(52) U.S. Cl.
CPC .......... *H04L 1/0041* (2013.01); *H04L 1/0045* (2013.01)

(58) Field of Classification Search
CPC ............................ H04L 1/0041; H04L 1/0045
See application file for complete search history.

(56) References Cited

U.S. PATENT DOCUMENTS 5,936,520 A * 8/1999 Luitje .................. G08B 26/001 340/505
5,961,655 A * 10/1999 Johnson .............. G06F 11/1052 714/48
6,344,877 B1 2/2002 Gowda et al.
7,788,528 B2 * 8/2010 Chang .................. G11C 29/848 714/6.32
7,793,193 B2 * 9/2010 Koch ..................... H04L 1/0041 714/776
10,890,814 B2 * 1/2021 Hsu ...................... H10D 86/441
2002/0015091 A1 * 2/2002 Honguu ................... H04N 7/14 348/E7.078
2005/0141943 A1 * 6/2005 Chapman ................. H04N 1/36 400/76
2005/0220057 A1 * 10/2005 Monsen ................ H04L 1/0041 370/334
2006/0044582 A1 * 3/2006 Seaman ............. H04N 1/00962 358/1.15
2006/0198387 A1 * 9/2006 Yonge, III ............... H04B 3/54 370/465

(Continued)

FOREIGN PATENT DOCUMENTS

CN 115963917 B * 4/2024

*Primary Examiner* — Chris Parry
*Assistant Examiner* — Dixon F Dabipi
(74) *Attorney, Agent, or Firm* — Loza & Loza LLP

(57) ABSTRACT

Aspects of the disclosure are directed to error recovery. In accordance with one aspect, an apparatus includes a plurality of sensors configured to generate a plurality of sensor data; a plurality of sensor interfaces, wherein each one of the plurality of sensor interfaces is coupled to each one of the plurality of sensors; and an aggregator, coupled to the plurality of sensor interfaces, the aggregator configured a) to multiplex the plurality of sensor data into a single aggregator output stream, b) to detect a transmission error in the plurality of sensor data, and c) to recover the transmission error using an aggregator hardware without software involvement.

30 Claims, 11 Drawing Sheets

(56) References Cited

U.S. PATENT DOCUMENTS

| | | | | |
|---|---|---|---|---|
| 2007/0195699 | A1* | 8/2007 | Kloth | H04L 1/0082<br>370/235 |
| 2008/0189352 | A1* | 8/2008 | Mitchell | H04L 1/22<br>709/201 |
| 2012/0188406 | A1* | 7/2012 | Hyatt | G06T 5/20<br>348/222.1 |
| 2013/0312043 | A1* | 11/2013 | Stone | H04W 12/06<br>725/62 |
| 2015/0087081 | A1* | 3/2015 | Kim | H10K 59/805<br>438/4 |
| 2015/0312476 | A1* | 10/2015 | Wakabayashi | H04N 23/60<br>348/231.99 |
| 2018/0288344 | A1* | 10/2018 | Chu | H04N 23/65 |
| 2018/0359405 | A1* | 12/2018 | Clayton | H04N 7/181 |
| 2021/0209390 | A1* | 7/2021 | Chae | H04N 1/00082 |
| 2021/0309020 | A1* | 10/2021 | Siman Tov | H04N 1/409 |
| 2024/0113805 | A1* | 4/2024 | Kong | H04L 5/0044 |

* cited by examiner

EXTENDED REALITY AGGREGATOR LOW LATENCY ROBUST ERROR RECOVERY

TECHNICAL FIELD

This disclosure relates generally to the field of error recovery, and, in particular, to extended reality (XR) aggregator low latency robust error recovery.

BACKGROUND

Usage of a plurality of sensors provides information for a user application. For example, one processing engine may be more power efficient than another. However, certain information may be corrupted upon transmission. Hence, there is a motivation in improving error resilience to attain optimal user experience.

SUMMARY

The following presents a simplified summary of one or more aspects of the present disclosure, in order to provide a basic understanding of such aspects. This summary is not an extensive overview of all contemplated features of the disclosure, and is intended neither to identify key or critical elements of all aspects of the disclosure nor to delineate the scope of any or all aspects of the disclosure. Its sole purpose is to present some concepts of one or more aspects of the disclosure in a simplified form as a prelude to the more detailed description that is presented later.

In one aspect, the disclosure provides error recovery. Accordingly, an apparatus for error recovery, the apparatus including a plurality of sensors configured to generate a plurality of sensor data; a plurality of sensor interfaces, wherein each one of the plurality of sensor interfaces is coupled to each one of the plurality of sensors; and an aggregator, coupled to the plurality of sensor interfaces, the aggregator configured a) to multiplex the plurality of sensor data into a single aggregator output stream, b) to detect a transmission error in the plurality of sensor data, and c) to recover the transmission error using an aggregator hardware without software involvement.

In one example, the apparatus further includes a processing unit configured to receive the single aggregator output stream and to process the plurality of sensor data. In one example, the apparatus further includes a processor memory coupled to the processing unit. In one example, the apparatus further includes an aggregator memory coupled to the aggregator.

In one example, the aggregator includes a plurality of input interface configured to receive the plurality of sensor data. In one example, the aggregator includes a multiplexer configured to generate the single aggregator output stream. In one example, the processor includes a processor interface configured to receive the single aggregator output stream. In one example, the processing unit includes a plurality of processors wherein each of the plurality of processors is coupled to the processor interface. In one example, each of the plurality of processors has a one-to-one correspondence with each of the plurality of sensor data. In one example, each of the plurality of processors processes the one-to-one correspondence of each of the plurality of sensor data. In one example, the plurality of sensor data has a one-to-one correspondence with each of the plurality of sensors.

Another aspect of the disclosure provides a method for error recovery, the method including detecting a packet data corruption event in a series of frames of data transmission from a plurality of sensors; determining if the packet data corruption event is an errored pixel or an errored line in the series of frames of data transmission from the plurality of sensors; replacing the errored pixel with a dummy pixel or replace the errored line with a dummy line; and sending an error flag message to notify a plurality of processors of a presence and a location of the dummy pixel or the dummy line in the series of frames of data transmission from the plurality of sensors.

In one example, the method further includes detecting the packet data corruption event using an error correction code (ECC). In one example, the method further includes detecting the packet data corruption event using an error detection code (EDC). In one example, the method further includes detecting the packet data corruption event using a payload count value. In one example, the payload count value is a byte count or a bit count.

In one example, the method further includes determining if the packet data corruption event is the errored pixel or the errored line by using an aggregator hardware without software involvement. In one example, the method further includes replacing the errored pixel by using the aggregator hardware without software involvement. In one example, the method further includes resuming data transmission in the series of frames of data transmission from the plurality of sensors with a subsequent line.

In one example, the errored pixel is an element of an image and the errored line is one dimensional with a plurality of errored pixels within the image. In one example, the location is a numerical index which indicates which pixel of the image is the dummy pixel or which line of the image is the dummy line.

Another aspect of the disclosure provides a method for error recovery, the method including detecting an image control error event in a series of frames of data transmission from a plurality of sensors; generating a synthesized control packet based on a detection of the image control error event; and resuming data transmission in the series of frames of data transmission from the plurality of sensors with a subsequent line after the detection of the image control error event.

In one example, the image control error event is a start of frame (SOF) packet control error or an end of frame (EOF) packet control error. In one example, the image control error event is a start of line (SOL) packet control error or an end of line (EOL) packet control error.

In one example, the method further includes generating the synthesized control packet by using an aggregator hardware without software involvement. In one example, the method further includes creating a synthesized user-defined (UD) packet to signify the detection of the image control error event. In one example, the method further includes creating the synthesized user-defined (UD) packet by using an aggregator hardware without software involvement.

Another aspect of the disclosure provides a non-transitory computer-readable medium storing computer executable code, operable on a device including at least one processor and at least one memory coupled to the at least one processor, wherein the at least one processor is configured to implement error recovery, the computer executable code including instructions for causing a computer to detect a packet data corruption event in a series of frames of data transmission from a plurality of sensors; instructions for causing the computer to determine if the packet data corruption event is an errored pixel or an errored line in the series of frames of data transmission from the plurality of sensors; instructions for causing the computer to replace the errored pixel with a dummy pixel or replace the errored line with a dummy line; and instructions for causing the computer to send an error flag message to notify a plurality of processors of a presence and a location of the dummy pixel or the dummy line in the series of frames of data transmission from the plurality of sensors.

In one example, the non-transitory computer-readable medium further includes instructions for causing the computer to determine if the packet data corruption event is the errored pixel or the errored line by using an aggregator hardware without software involvement and to replace the errored pixel by using the aggregator hardware without software involvement. In one example, the non-transitory computer-readable medium further includes instructions for causing the computer to detect the packet data corruption event using an error correction code (ECC), an error detection code (EDC) or a payload count value.

These and other aspects of the present disclosure will become more fully understood upon a review of the detailed description, which follows. Other aspects, features, and implementations of the present disclosure will become apparent to those of ordinary skill in the art, upon reviewing the following description of specific, exemplary implementations of the present invention in conjunction with the accompanying figures. While features of the present invention may be discussed relative to certain implementations and figures below, all implementations of the present invention can include one or more of the advantageous features discussed herein. In other words, while one or more implementations may be discussed as having certain advantageous features, one or more of such features may also be used in accordance with the various implementations of the invention discussed herein. In similar fashion, while exemplary implementations may be discussed below as device, system, or method implementations it should be understood that such exemplary implementations can be implemented in various devices, systems, and methods.

DETAILED DESCRIPTION

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

While for purposes of simplicity of explanation, the methodologies are shown and described as a series of acts, it is to be understood and appreciated that the methodologies are not limited by the order of acts, as some acts may, in accordance with one or more aspects, occur in different orders and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with one or more aspects.

Modern information processing systems rely on a plurality of sensors to provide information for a user application. In one example, the plurality of sensors is used to promote error recovery, for example, to promote reality (XR) aggregator low latency robust error recovery.

One common usage of an information processing system is for a mobile device (e.g., smartphone). In one example, the mobile device provides a variety of user applications such as mobile telephony, text messaging, email, Internet access, social media, video entertainment, gaming, audio programs, news updates, musical entertainment, financial data, etc. One application of an information processing system is sensor processing, that is, the manipulation and display of sensor information.

Figure 1:
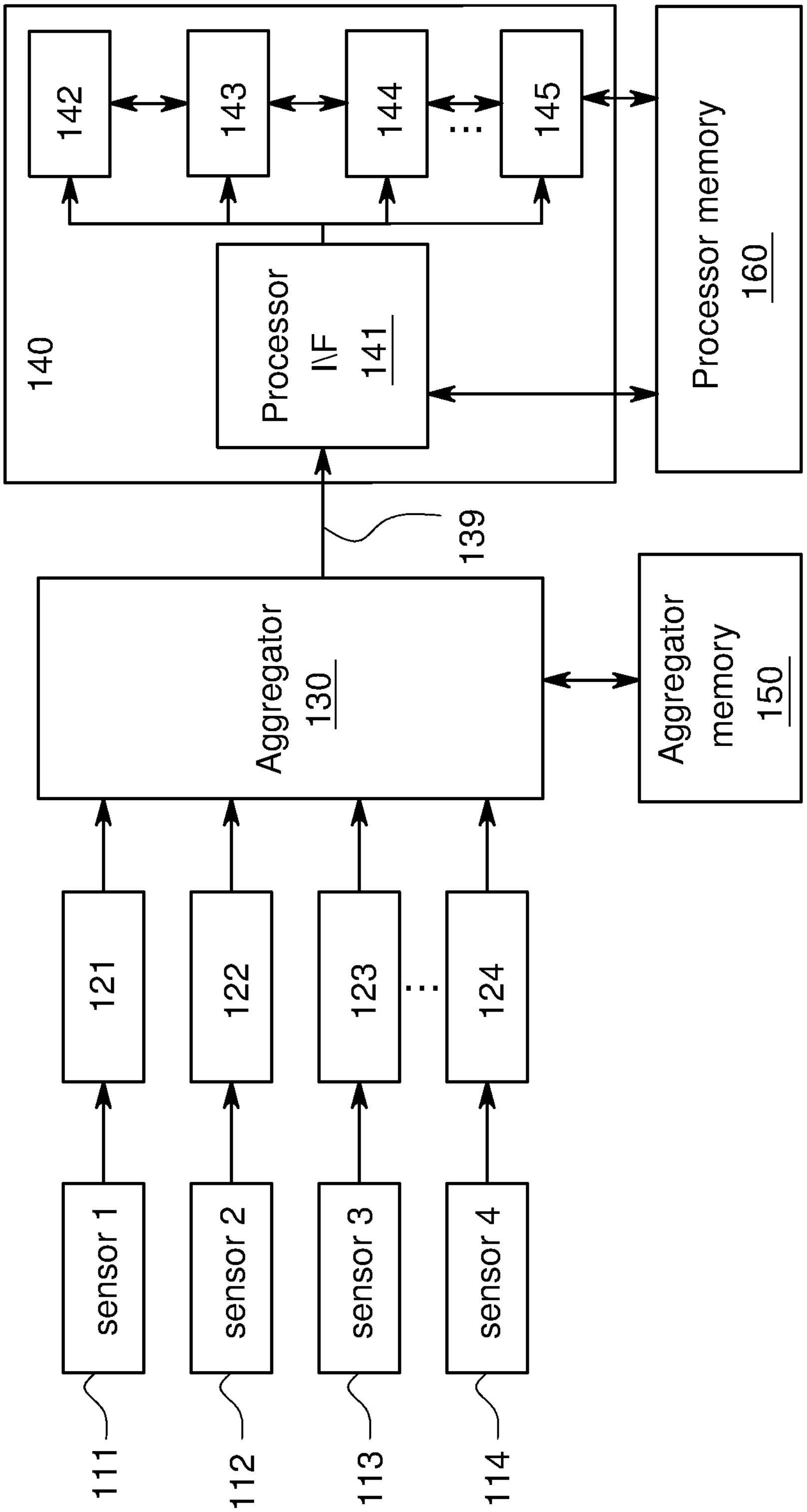
FIG. 1 illustrates an example of a sensor aggregation system for aggregating sensor data from a plurality of sensors.

FIG. 1 illustrates an example of a sensor aggregation system 100 for aggregating sensor data from a plurality of sensors. In one example, the plurality of sensors includes a first sensor 111 with a first sensor interface 121, a second sensor 112 with a second sensor interface 122, a third sensor 113 with a third sensor interface 123 and so on until an Mth sensor 114 with an Mth sensor interface 124. In one example, the plurality of sensors includes a camera (e.g., head tracking camera, hand tracking camera, eye tracking camera etc.), an inertial measurement unit (IMU), an infrared (IR) illuminator, etc. In one example, the plurality of sensors produces a plurality of sensor data which are transferred over the first sensor interface 121, the second sensor interface 122, the third sensor interface 123, the Mth sensor interface 124, etc. One skilled in the art would understand that the quantity M can include any integer quantity appropriate for a particular application.

In one example, the plurality of sensors is connected to an aggregator 130 using the first sensor interface 121, the second sensor interface 122, third sensor interface 123, the Mth sensor interface 124, etc. In one example, the aggregator 130 is also connected to an aggregator memory 150. In one example, the aggregator 130 multiplexes (i.e., combines) the plurality of sensor data received from the plurality of sensors and packages the plurality of sensor data into a single aggregator output stream 139 as an output of the aggregator 130. In one example, the single aggregator output stream 139 is in a mobile industry processor interface (MIPI) data format.

In one example, the single aggregator output stream 139 is sent to a processor 140. In the example of FIG. 1, the processor 140 is a plurality of processors 142, 143, 144, 145 coupled to a processor interface 141. In one example, the plurality of processors 142, 143, 144, 145 is also connected to a processor memory 160. In one example, the processor interface 141 distributes the single aggregator output stream 139 to a first processor 142, a second processor 143, a third processor 144, and so on until an Nth processor 145. One skilled in the art would understand that the quantity N can include any integer quantity appropriate for a particular application.

In one example, the plurality of sensor data from the plurality of sensors may be organized into a series of frames. For example, the series of frames may be a series of two-dimensional pixels, where a pixel is an element of an image. For example, the series of frames may be a series of one-dimensional lines. That is, each line is one dimensional with a plurality of pixels and each frame is two dimensional with a sequence of lines.

In one example, the aggregator 130 is used for both low speed and high speed aggregation by aggregation of the plurality of sensor data into a single aggregator output stream 139. In one example, the plurality of sensor data is transported as a sequence of data packets from the plurality of sensors to the aggregator 130. In one example, the sequence of data packets includes control data and payload data. For example, the control data represent overhead information such as start of frame (SOF), start of line (SOL), end of line (EOL), end of frame (EOF) which may be sent as short packets. In one example, a packet is a group of data with a common origin and destination. For example, the payload data may represent pixels which may be sent as long packets.

In one example, the transport of the sequence of data packets may be subjected to transmission errors which may be detected at the aggregator 130. In one example, detected transmission errors may need to be handled and recovered at the aggregator 130.

In one example, the transmission errors may be packet data corruption. In another example, the transmission errors may be image control errors. In one example, the design of the transport of the sequence of data packets has a requirement for low latency and a system level solution for handling and recovery of detected transmission errors at the aggregator 130.

Figure 2:
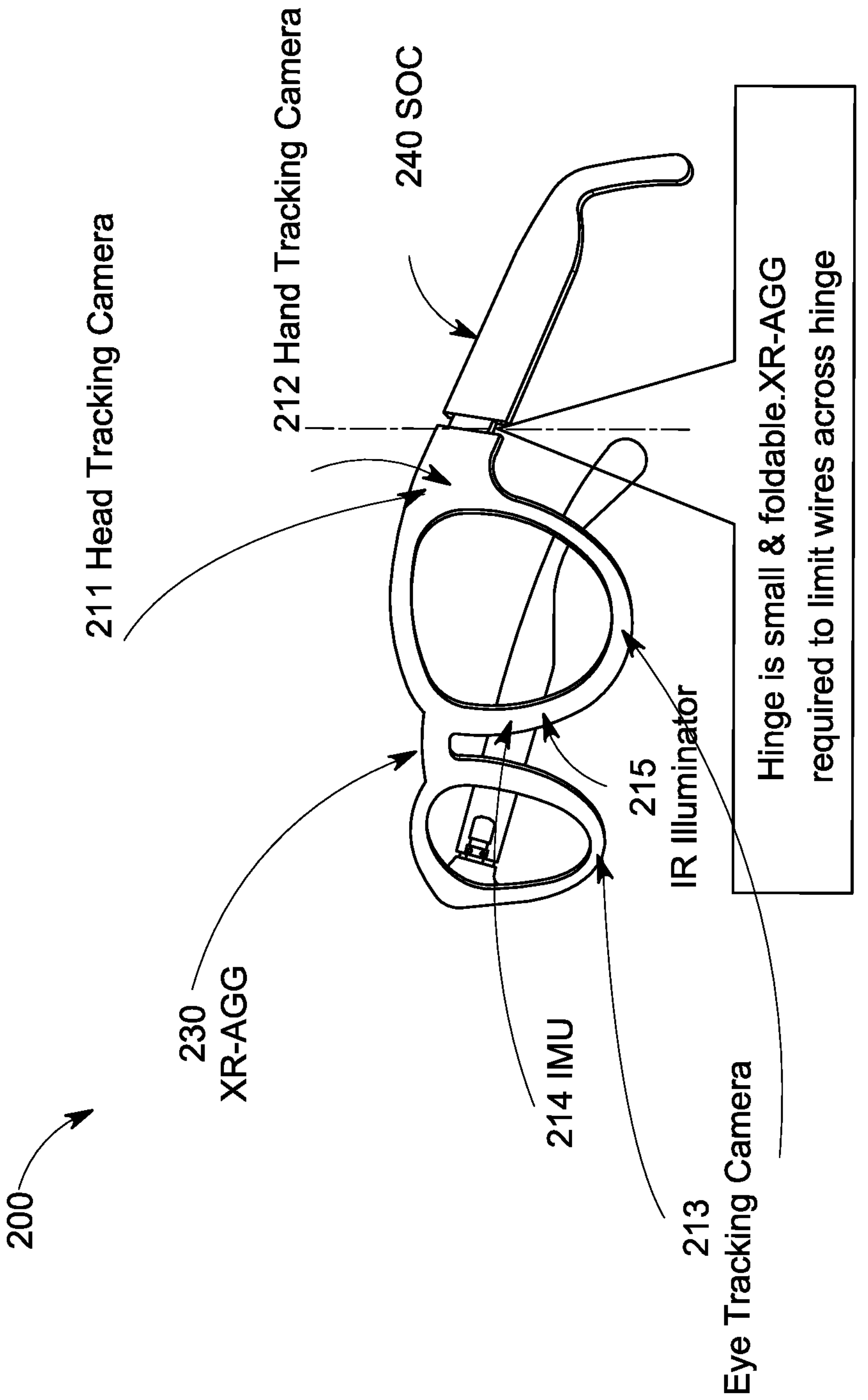
FIG. 2 illustrates an example of a sensor aggregation system for an extended reality (XR) user application.

FIG. 2 illustrates an example of a sensor aggregation system 200 for an extended reality (XR) user application. In one example, the user application is an eyewear with embedded sensors with an integrated system on a chip (SOC). In one example, the example sensor aggregation system 200 includes a plurality of sensors which generate a plurality of sensor data from a head tracking camera 211, a hand tracking camera 212, eye tracking cameras 213, an inertial measurement unit (IMU) 214, an infrared (IR) illuminator 215, etc. In one example, the example sensor aggregation system 200 also includes an aggregator (XR-AGG) 230 which aggregates the plurality of sensor data into a single aggregator output stream. In one example, the single aggregator output stream is required to traverse a small and foldable hinge which may have a constraint on transmission line density (e.g., number of wires across the hinge). In one example, the single aggregator output stream is sent to a system on a chip (SOC) 240.

In one example, the sequence of data packets is transported over a network consisting of a plurality of network nodes and a plurality of network paths. In one example, the network transports information from source terminals to destination terminals. In one example, the plurality of network nodes is used to route the sequence of data packets from a source terminal to a destination terminal using a subset of the plurality of network paths. In one example, the network is organized and managed using a plurality of network layers, including a physical (PHY) layer. In one example, the PHY layer is the network layer which directly accesses a physical transmission medium which is a foundation for the plurality of network paths. For example, the physical transmission medium may be a wired medium (e.g., Ethernet medium) or a wireless medium (e.g., WiFi medium).

In one example, the sequence of data packets may include a variety of packet data types. For example, a first packet data type may be a first physical layer data packet (e.g., D-PHY). For example, a second packet data type may be a second physical layer data packet (e.g., C-PHY). In one example, a physical layer data packet is a group of bits which are transported directly onto physical transmission medium.

In one example, the physical layer data packet includes two data fields: a packet header and a packet payload. In one example, the packet header contains overhead information for the physical layer data packet, such as synchronization data, configuration data, signaling data, sequencing data, channel data, messaging data, protocol data, etc. In one example, the packet header includes a byte count to indicate a quantity of data bytes (i.e., a data byte contains 8 bits of data). The first physical layer data packet may include a first packet header. The second physical layer data packet may include a second packet header.

In one example, the packet payload contains user information transported between source terminals and destination terminals. The first physical layer data packet may include a first packet payload. The second physical layer data packet may include a second packet payload.

In one example, transport of the sequence of data packets may be corrupted by introduction of transmission errors or data errors. For example, noise or distortion in the plurality of network paths may cause a bit error (e.g., an incorrect decision between two possible binary states) or a bit erasure (e.g., an indeterminate binary state). In one example, an error control scheme may be employed to mitigate transmission errors or data errors. In one example, the error control scheme may be an error correction code or an error detection code. For example, the error correction code may detect and correct data errors. For example, the error detection code may detect data errors. For example, the error detection code may be coupled to a request-retransmission scheme where a receiver detects data errors and requests a transmitter to retransmit portions of the sequence of data packets which include the detected data errors.

In one example, the packet header may include error control information, for example, error correction code or error detection code. For example, an error correction code (ECC) may be used to detect and correct data errors in the packet header. For example, an error detection code (EDC) may be used to detect data errors in the packet header.

In one example, the first packet header of the first packet data type (e.g., D-PHY) may include an ECC. In one example, the ECC is used to detect data errors in the first packet header of the first packet data type. In one example, the ECC is used also to correct data errors in the first packet header of the first packet data type if the data errors are within the capability of the ECC. For example, if the ECC is capable of detecting and correcting a single bit error, then data errors in the first packet header of the first packet data type are corrected. For example, if the ECC is capable of detecting but not correcting data errors in the first packet header, then data errors in the first packet header are not corrected and a first error flag message is generated to denote data corruption in the first packet data type.

In one example, the second packet header of the second data type (e.g., C-PHY) may include an EDC. In one example, the EDC is used to detect data errors in the second packet header of the second packet data type. In one example, the EDC is a cyclic redundancy check (CRC) code. In one example, the EDC is used to correct data errors in the second packet header of the second packet data type if the data errors are within the capability of the EDC. For example, if the EDC is capable of detecting data errors in the second packet header, then data errors in the second packet header are not corrected and a second error flag message is generated to denote data corruption in the second packet data type.

In one example, the packet payload may include error control information, for example, an EDC. For example, the EDC may be used to detect data errors in the packet payload.

In one example, the packet payload may also be subjected to data errors. In one example, the physical layer data packet may include error control information, for example, EDC. For example, the error control information may include a CRC code in the physical layer data packet, for example, in a footer of the physical layer data packet. In another example, the physical layer data packet may include a payload count value, for example, a byte count or a bit count, in the header of physical layer data packet. In one example, the payload count value may be compared with an actual received payload count value, i.e., an actual value of the payload count after reception. In one example, if the payload count value does not equal the actual received payload count value (i.e., there is a mismatch in payload count value), a third error flag message is generated to denote data corruption in the packet payload.

In one example, generation of the first error flag message, the second error flag message, the third error flag message, etc., may indicate corruption of the physical layer data packet and may indicate that the packet payload is not reliable and may not be further processed or used. In one example, the packet payload corresponds to a single line of an image as received by at least one sensor of the plurality of sensors.

In one example, a first error scenario may include a data corruption event in a single data packet from one sensor out of a plurality of sensors. In the first error scenario, one element of the sensor aggregation system, e.g., the aggregator, may halt data transmission from the one sensor which has data corruption until a reset or recovery procedure is complete. In one example, the recovery procedure includes hardware from the aggregator (i.e., aggregator hardware) informing software from the aggregator (i.e., aggregator software) of a data corruption event, and next the aggregator software informing software in the plurality of processors (i.e., processor software) of the data corruption event. As a result, the processor software in the plurality of processors responds to the data corruption event by resetting and halting data transmission from the plurality of sensors.

In one example, resetting is required in the plurality of processors (e.g., in an image signal processor (ISP)) to clear a corrupted data packet from transmission and to avoid a hardware violation from a subsequent data packet processing by the plurality of processors. In one example, the resetting requires a halt in a processor interface which receives the data transmission which also forces a halt in the data transmission from the plurality of sensors until the recovery procedure is complete.

That is, in one example, the data corruption event in the single data packet from one sensor out of the plurality of sensors results in a halt in all sensors. In one example, the halt of all sensors results in a long latency (i.e., delay) during the recovery procedure since it is controlled and handled by software in the plurality of processors. In one example, long latency in an extended reality user application is undesirable (e.g., due to induced nausea or motion sickness).

Figure 3:
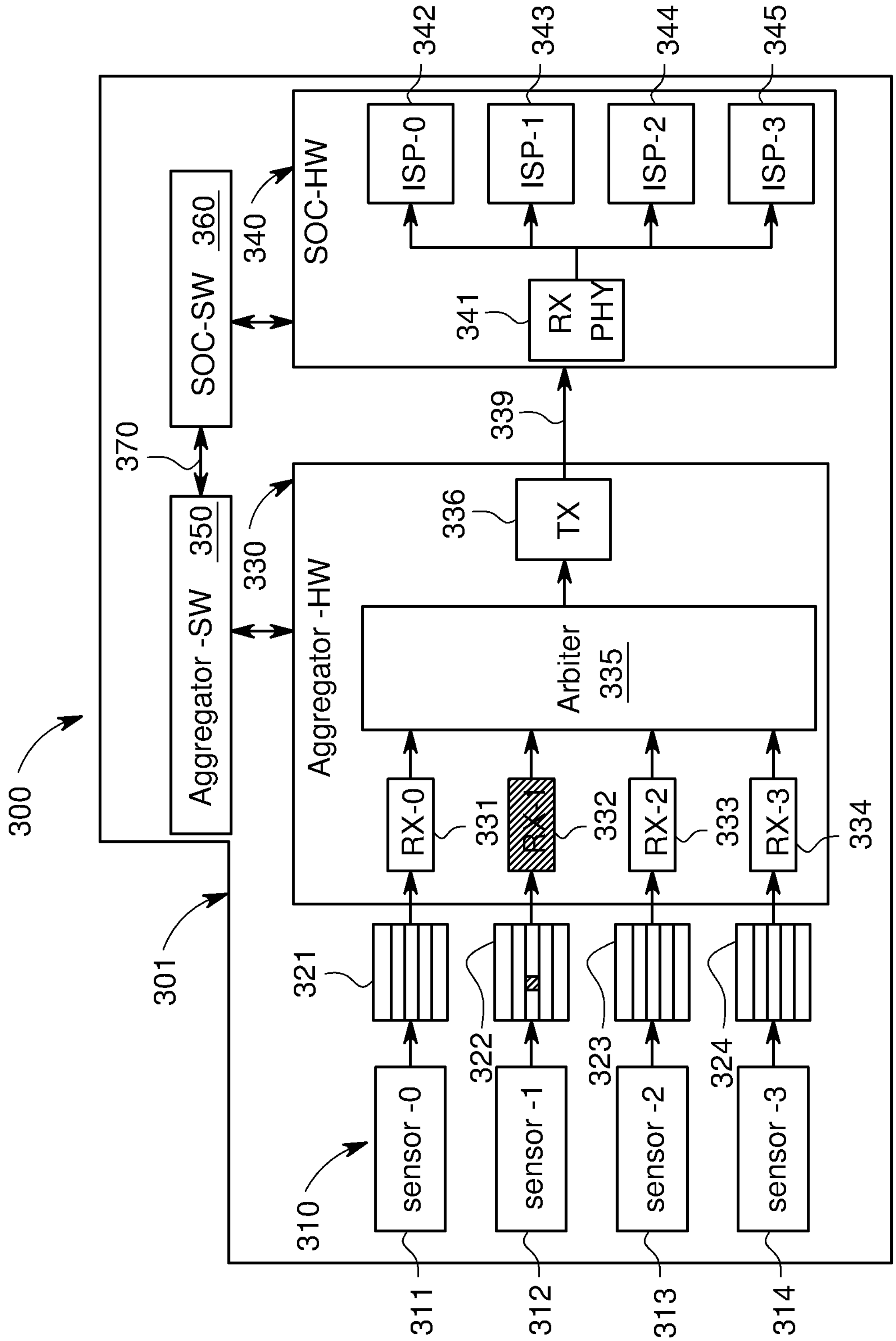
FIG. 3 illustrates an example of a data corruption event in a single data packet.

FIG. 3 illustrates an example of a data corruption event 300 in a single data packet. In one example, the sensor aggregation system 301 with a plurality of sensors 310 includes a first sensor 311 with a first sensor interface 321, a second sensor 312 with a second sensor interface 322, a third sensor 313 with a third sensor interface 323 and a fourth sensor 314 with a fourth sensor interface 324. In the example of FIG. 3, there is a data corruption event in a single data packet from the second sensor 312 which may appear in the second sensor interface 322.

In one example, an aggregator 330, which includes a first input interface (RX-0) 331, a second input interface (RX-1) 332, a third input interface (RX-2) 333 and a fourth input interface (RX-3) 334, performs multiplexing (i.e., aggregation) of data transmission from the plurality of sensors 310 using a multiplexer or arbiter 335 to produce a multiplexed data stream 339 (a.k.a. a single aggregator output stream) which is sent to an output interface 336 (a.k.a. transmit, TX). In one example, the aggregator 330 is also connected to an aggregator memory 350 (a.k.a. aggregator-SW). In one example, the aggregator 330 (a.k.a. aggregator-HW) is an aggregator hardware. In one example, the aggregator memory 350 (a.k.a. aggregator-SW) maintains aggregator software (SW).

In one example, the multiplexed data stream 339 from the output interface 336 is transported to a plurality of processors 340 (e.g., a system on a chip hardware (SOC-HW)) with a processor interface 341 (a.k.a. RX PHY) connected to a first processor 342 (ISP-0), a second processor 343 (ISP-1), a third processor 344 (ISP-2), and a fourth processor 345 (ISP-3). In one example, the plurality of processors 340 is also connected to a processor memory 360. In one example, the processor memory 360 maintains processor software (e.g., SOC software (SOC-SW)). In one example, the aggregator memory 350 is connected to the processor memory 360 via a memory databus 370. In one example, the memory databus 370 may be used to transfer software messages between the aggregator memory 350 and the processor memory 360. In one example, the plurality of processors 340 is a processing unit.

In one example, a second error scenario may include a data corruption event in a single data line from one sensor out of a plurality of sensors. In the second error scenario, one element of the sensor aggregation system, e.g., the aggregator, may dispose or erase the single data line from the one sensor which has data corruption until a next data line is received. In one example, the data corruption event in the single data line results in a dimension of data packets in a processor to be less than expected (e.g., based on configuration parameters). In one example, the data corruption event may cause a hardware violation from a subsequent data packet processing by the plurality of processors.

In one example, the hardware violation may induce a reset procedure. In one example, the reset procedure may require a halt in a processor interface which receives the data transmission which also forces a halt in the data transmission from the plurality of sensors until the reset procedure is complete. That is, in one example, the data corruption event in the single data line from one sensor out of the plurality of sensors results in a halt in all sensors. In one example, the halt of all sensors results in a latency during the reset procedure of the second error scenario which is less than the latency during the recovery procedure of the first error scenario since it is controlled and handled by hardware, not software.

Figure 4:
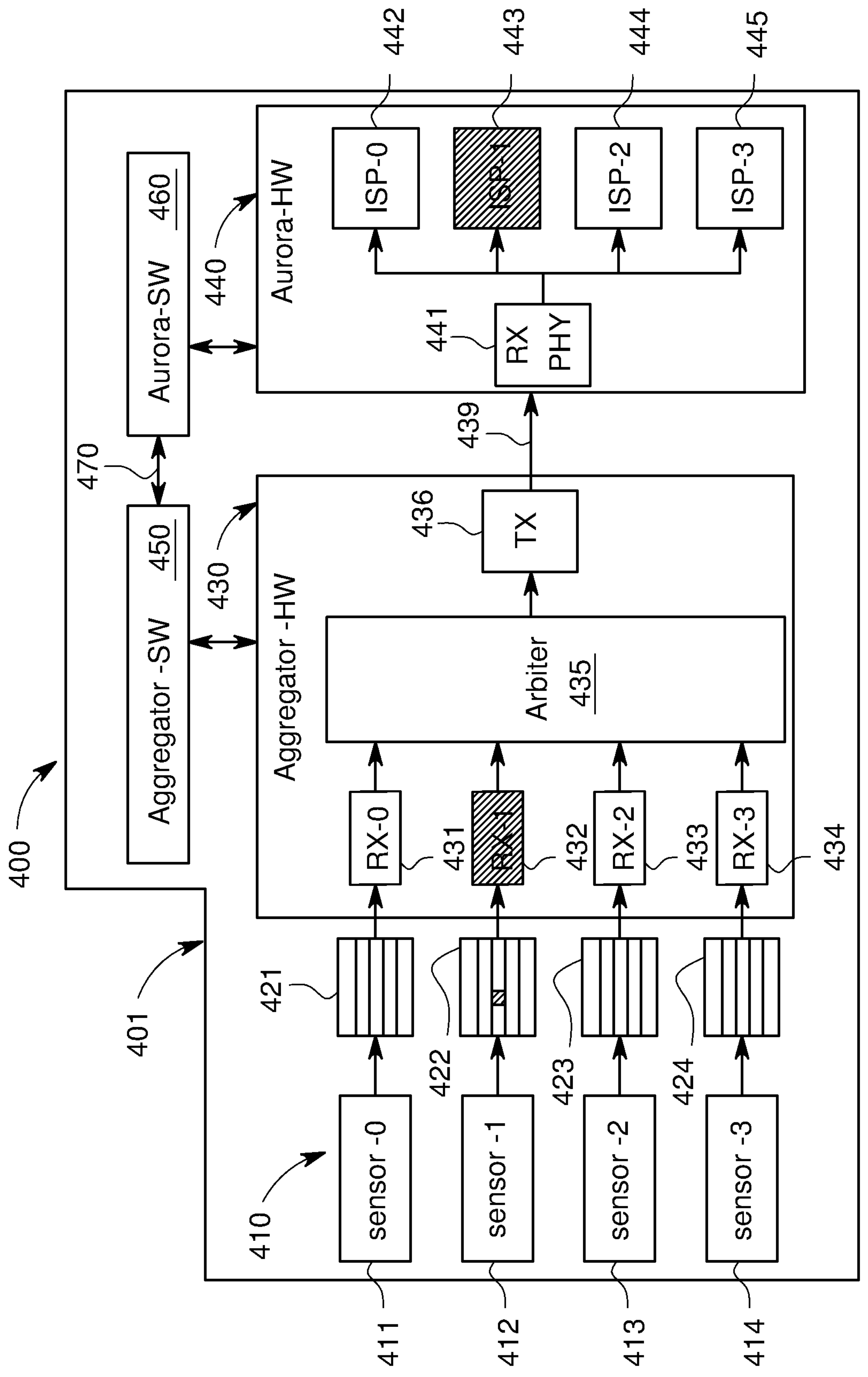
FIG. 4 illustrates an example of a data corruption event in a single data line.

FIG. 4 illustrates an example of a data corruption event 400 in a single data line. In one example, a sensor aggregation system 401 with a plurality of sensors 410 includes a first sensor 411 with a first sensor interface 421, a second sensor 412 with a second sensor interface 422, a third sensor 413 with a third sensor interface 423 and a fourth sensor 414 with a fourth sensor interface 424. In the example, in FIG. 4, there is a data corruption event in a single data line from the second sensor 412 which may appear in the second sensor interface 422.

In one example, an aggregator 430, which includes a first input interface (RX-0) 431, a second input interface (RX-1) 432, a third input interface (RX-2) 433 and a fourth input interface (RX-3) 434, performs multiplexing (i.e., aggregation) of data transmission from the plurality of sensors 410 using a multiplexer or arbiter 435 to produce a multiplexed data stream 439 which is sent to an output interface 436. In one example, the aggregator 430 is also connected to an aggregator memory 450. In one example, the aggregator 430 is aggregator hardware (a.k.a. aggregator-HW). In one example, the aggregator memory 450 (a.k.a. aggregator-SW) maintains aggregator software (SW).

In one example, the multiplexed data stream 439 from the output interface 436 (a.k.a. Transmit, TX) is transported to a plurality of processors 440 (a.k.a. Aurora-SW). In one example, the plurality of processors 440 (e.g., a system on a chip hardware (SOC-HW) includes a processor interface 441 (a.k.a. RX PHY) which is connected to a first processor 442 (ISP-0), a second processor 443 (ISP-1), a third processor 444 (ISP-2), and a fourth processor 445 (ISP-3). In one example, the plurality of processors 440 is also connected to a processor memory 460 (a.k.a. Aurora-SW). In one example, the processor memory 460 maintains processor software (e.g., SOC software). In one example, the aggregator memory 450 is connected to the processor memory 460 via a memory databus 470. In one example, the memory databus 470 may be used to transfer software messages between the aggregator memory 450 and the processor memory 460. In one example, the plurality of processors 440 is a processing unit.

In one example, error recovery from transmission errors may have certain desirable features. In one example, the error recovery may not degrade user experience, that is, an error in one sensor has no impact on data transmission from other sensors from the plurality of sensors. In one example, the error recovery may have low latency (i.e., minimal delay) for the sensor with the error. In one example, the error recovery may also be power efficient and area efficient, especially for extended reality user applications.

In one example, the error recovery from transmission errors handles packet data corruption. In another example the error recovery from transmission errors handles image control errors.

In one example, a first error recovery scheme in a sensor aggregation system for a packet data corruption event in a single data packet (i.e., an errored data packet) sourced from one sensor (i.e., an errored sensor) of the plurality of sensors includes a recovery padding sequence and an error flag sequence. For example, the recovery padding sequence first replaces a data line which includes the errored data packet with a dummy data line which includes dummy pixels and then resumes transmission from a subsequent data line. For example, the dummy pixels may have a default digital value, e.g., zero. In another example, the dummy pixels may have an arbitrary digital value, e.g., pseudorandom data.

In one example, the recovery padding sequence maintains a data packet dimension to avoid a hardware violation in the plurality of processors. For example, the recovery padding sequence avoids a reset.

In one example, the error flag sequence sends an error flag message via a user-defined (UD) packet to notify the plurality of processors (e.g., one processor of the plurality of processors which processes data from the errored sensor) of the introduction of the dummy data line. In one example, the plurality of processors (e.g., the one processor which processes data from the errored sensor) is informed of the presence and location of the dummy data line and executes a recovery action, such as, replacing the dummy data line with a previous data line. In one example, the UD packet is in the mobile industry processor interface (MIPI) data format.

In one example, the first error recovery scheme does not cause a system halt and allows other sensors of the plurality of sensors (i.e., sensors that are not the errored sensor) to operate seamlessly throughout the packet data corruption event. For example, the sensor aggregation system recovers in a subsequent data line which results in a rapid, robust and seamless error recovery.

Figure 5:
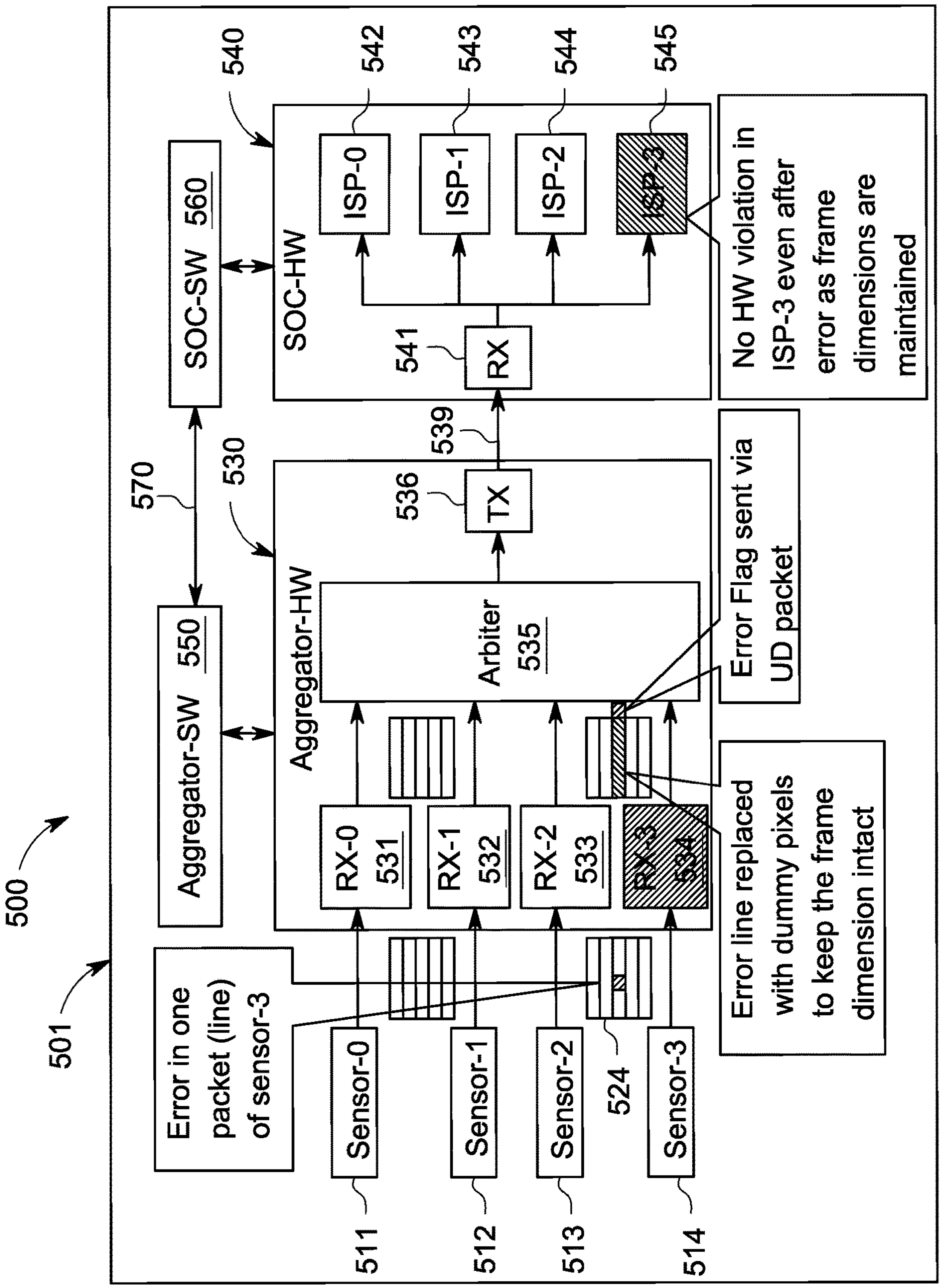
FIG. 5 illustrates an example of a first error recovery scheme in a sensor aggregation system.

FIG. 5 illustrates an example 500 of the first error recovery scheme in a sensor aggregation system 501. In one example, the sensor aggregation system 501 with a plurality of sensors 510 includes a first sensor 511 with a first sensor interface 521 (not labeled in FIG. 5), a second sensor 512 with a second sensor interface 522 (not labeled in FIG. 5), a third sensor 513 with a third sensor interface 523 (not labeled in FIG. 5) and a fourth sensor 514 with a fourth sensor interface 524. In the example in FIG. 5, there is a data corruption event in a single data line from the fourth sensor 514 which may appear in the fourth sensor interface 524.

In one example, an aggregator 530 (a.k.a. Aggregator-SW), which includes a first input interface (RX-0) 531, a second input interface (RX-1) 532, a third input interface (RX-2) 533 and a fourth input interface (RX-3) 534, performs multiplexing (i.e., aggregation) of data transmission from the plurality of sensors 510 using a multiplexer or arbiter 535 to produce a multiplexed data stream 539 which is sent to an output interface 536 (a.k.a. Transmit TX). In one example, the aggregator 530 is also connected to an aggregator memory 550 (a.k.a. Aggregator-SW). In one example, the aggregator 530 (a.k.a. Aggregator-HW) is aggregator hardware. In one example, the aggregator memory 550 maintains aggregator software.

In one example, the aggregator 530 detects a packet data corruption event in a series of frames of data transmission from a plurality of sensors. In one example, the detection employs an error correction code (ECC), for example, a linear block code, a convolutional code, a concatenated code or a capacity approaching code. In one example, the detection employs an error detection code (EDC) for example, a CRC code. In one example, the detection employs a payload count value, for example, a byte count or a bit count. In one example, an error in one packet or line in the fourth sensor interface 524 is detected and aggregator 530 replaces the error with a dummy data line and sends an error message via a UD packet at the fourth input interface 534.

In one example, the multiplexed data stream 539 from the output interface 536 is transported to a plurality of processors 540 (e.g., a system on a chip hardware (SOC-HW)) with a processor interface 541 connected to a first processor 542, a second processor 543, a third processor 544, and a fourth processor 545. In one example, the plurality of processors 540 is also connected to a processor memory 560 (e.g., a system on a chip software (SOC-SW)). In one example, the processor memory 560 maintains processor software (e.g., SOC software, SOC-SW). In one example, the aggregator memory 550 is connected to the processor memory 560 via a memory databus 570. In one example, the memory databus 570 may be used to transfer software messages between the aggregator memory 550 and the processor memory 560. In one example, the plurality of processors 540 is a processing unit.

In one example, a second error recovery scheme in a sensor aggregation system for a packet data corruption event in a single data packet (i.e., an errored data packet) sourced from one sensor (i.e., an errored sensor) of the plurality of sensors includes a second error flag sequence and a second recovery padding sequence. For example, the second recovery padding sequence first replaces a data line which includes the errored data packet with a dummy data line which includes dummy pixels and then resumes transmission from a subsequent data line. For example, the dummy pixels may have a default digital value, e.g., zero. In another example, the dummy pixels may have an arbitrary digital value, e.g., pseudorandom data.

In one example, the second recovery padding sequence maintains a data packet dimension to avoid a hardware violation in the plurality of processors. For example, the recovery padding sequence avoids a reset.

In one example, the second error flag sequence sends an error flag message via a user-defined (UD) packet to notify the plurality of processors (e.g., one processor of the plurality of processors which processes data from the errored sensor) of the introduction of the dummy data line. In one example, the plurality of processors (e.g., the one processor which processes data from the errored sensor) is informed of the presence and location of the dummy data line and executes a recovery action, such as, replacing the dummy data line with a previous data line. In one example, the UD packet is in the MIPI data format.

In one example, the second error recovery scheme does not cause a system halt and allows other sensors of the plurality of sensors (i.e., sensors that are not the errored sensor) to operate seamlessly throughout the packet data corruption event. For example, the sensor aggregation system recovers in a subsequent data line which results in a rapid, robust and seamless error recovery.

Figure 6:
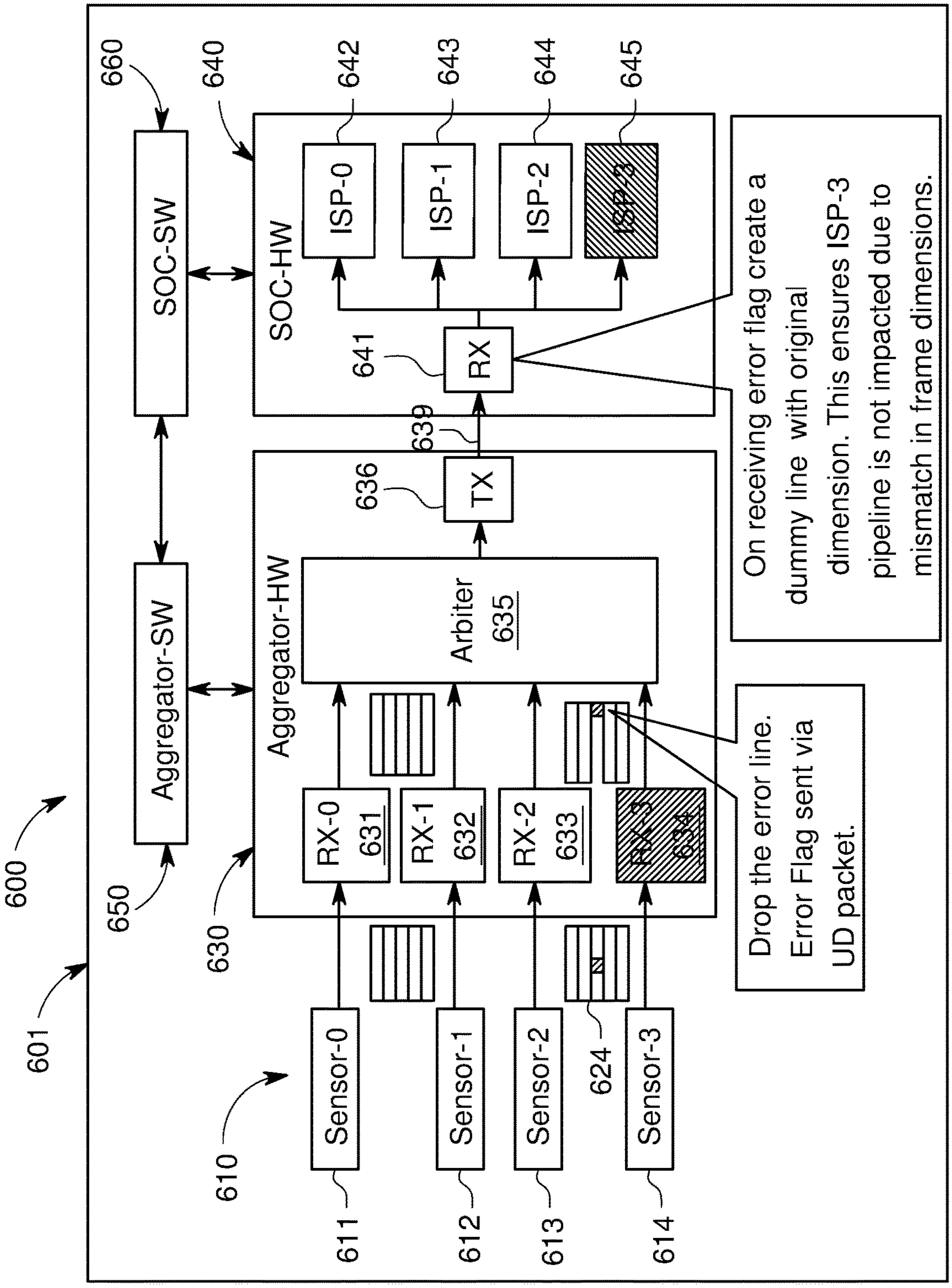
FIG. 6 illustrates an example of a second error recovery scheme in a sensor aggregation system.

FIG. 6 illustrates an example 600 of a second error recovery scheme in a sensor aggregation system 601. In one example, the sensor aggregation system 601 with a plurality of sensors 610 includes a first sensor 611 with a first sensor interface 621 (not labeled in FIG. 6), a second sensor 612 with a second sensor interface 622 (not labeled in FIG. 6), a third sensor 613 with a third sensor interface 623 (not labeled in FIG. 6) and a fourth sensor 614 with a fourth sensor interface 624. In the example in FIG. 6, there is a data corruption event in a single data line from the fourth sensor 614 which may appear in the fourth sensor interface 624.

In one example, an aggregator 630 (a.k.a. Aggregator-HW), which includes a first input interface (RX-0) 631, a second input interface (RX-1) 632, a third input interface (RX-2) 633 and a fourth input interface (RX-3) 634, performs multiplexing (i.e., aggregation) of data transmission from the plurality of sensors 610 using a multiplexer or arbiter 635 to produce a multiplexed data stream 639 which is sent to an output interface 636. In one example, the aggregator 630 is also connected to an aggregator memory 650 (a.k.a. Aggregator-SW). In one example, the aggregator 630 is aggregator hardware. In one example, the aggregator memory 650 maintains aggregator software.

In one example, the aggregator 630 detects a packet data corruption event in a series of frames of data transmission from a plurality of sensors. In one example, the detection employs an error correction code (ECC), for example, a linear block code, a convolutional code, a concatenated code or a capacity approaching code. In one example, the detection employs an error detection code (EDC) for example, a CRC code. In one example, the detection employs a payload count value, for example, a byte count or a bit count.

In one example, when the data corruption event occurs, the aggregator 630 drops the errored line and sends an error flag message via a user-defined (UD) packet to notify the plurality of processors of the data corruption event. In one example, an error in one packet or line in the fourth sensor interface 624 is detected and aggregator 630 sends an error message via a UD packet at the fourth input interface 634. In one example, the plurality of processors 640 generates a dummy data line for data throughput continuity.

In one example, the multiplexed data stream 639 from the output interface 636 is transported to a plurality of processors 640 (e.g., a system on a chip hardware (SOC-HW)) with a processor interface 641 connected to a first processor 642, a second processor 643, a third processor 644, and a fourth processor 645. In one example, the plurality of processors 640 is also connected to a processor memory 660 (e.g., a system on a chip software (SOC-SW)). In one example, the processor memory 660 maintains processor software (e.g., SOC software, SOC-SW). In one example, the aggregator memory 650 is connected to the processor memory 660 via a memory databus 670. In one example, the memory databus 670 may be used to transfer software messages between the aggregator memory 650 and the processor memory 660. In one example, the plurality of processors 640 is a processing unit.

In one example, when the data corruption event occurs, the plurality of processors 640 receives the error flag message and synthesizes a dummy data line with an original dimension to maintain data throughput continuity in the plurality of processors 640.

In one example, a third error recovery scheme in a sensor aggregation system for a packet data corruption event in a single data packet (i.e., an errored data packet) sourced from one sensor (i.e., an errored sensor) of the plurality of sensors includes a third error flag sequence and a third recovery padding sequence.

Figure 7:
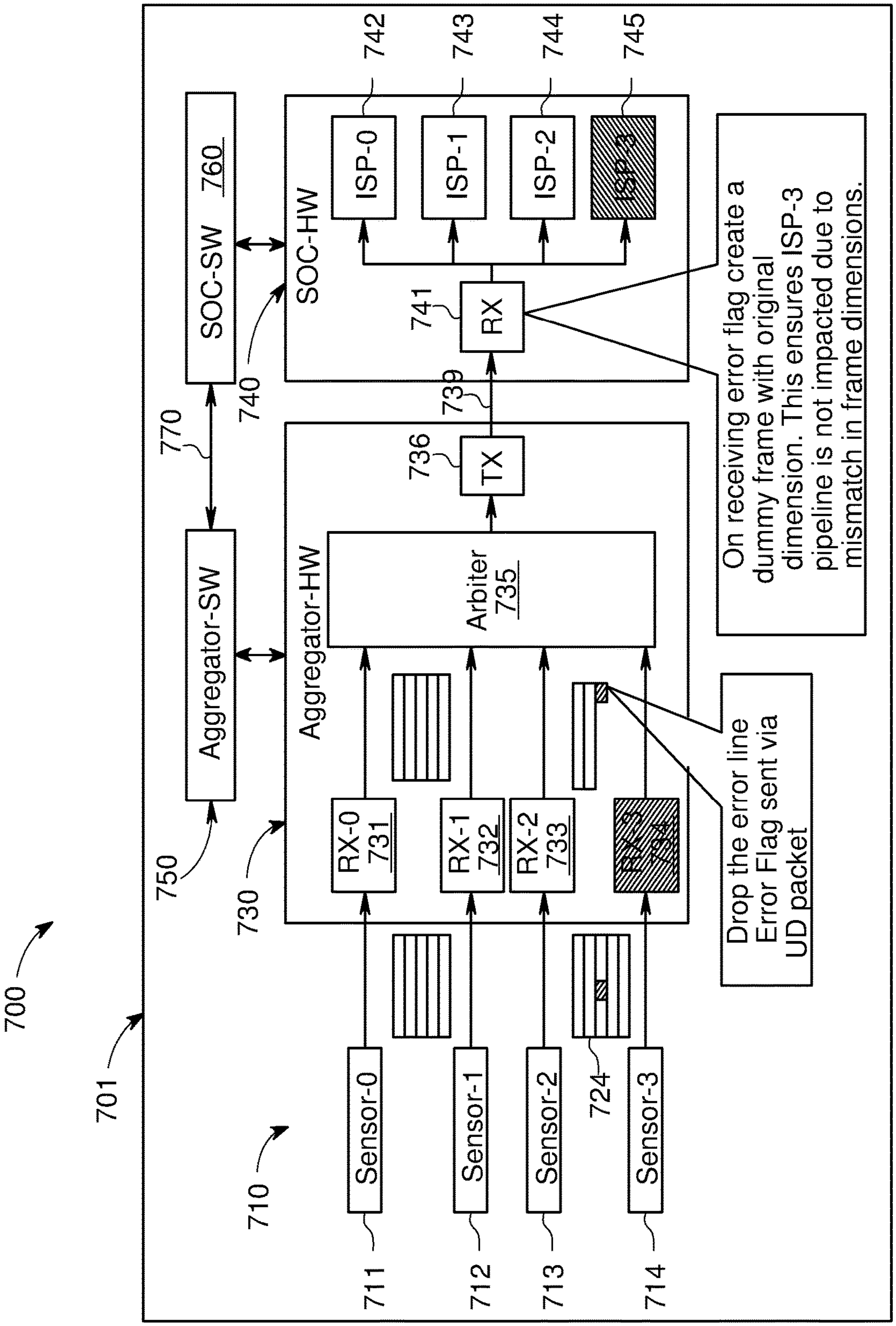
FIG. 7 illustrates an example of a third error recovery scheme in a sensor aggregation system.

FIG. 7 illustrates an example 700 of a third error recovery scheme in a sensor aggregation system 701. In one example, the sensor aggregation system 701 with a plurality of sensors 710 includes a first sensor 711 with a first sensor interface 721 (not labeled in FIG. 7), a second sensor 712 with a second sensor interface 722 (not labeled in FIG. 7), a third sensor 713 with a third sensor interface 723 (not labeled in FIG. 7) and a fourth sensor 714 with a fourth sensor interface 724. In one example, there is a data corruption event in a single data line from the fourth sensor 714 which may appear in the fourth sensor interface 724.

In one example, an aggregator 730 (a.k.a. Aggregator-HW), which includes a first input interface (RX-0) 731, a second input interface (RX-1) 732, a third input interface (RX-2) 733 and a fourth input interface (RX-3) 734, performs multiplexing (i.e., aggregation) of data transmission from the plurality of sensors 710 using a multiplexer or arbiter 735 to produce a multiplexed data stream 739 which is sent to an output interface 736. In one example, the aggregator 730 is also connected to an aggregator memory 750 (a.k.a. Aggregator-SW). In one example, the aggregator 730 is aggregator hardware. In one example, the aggregator memory 750 maintains aggregator software.

In one example, the aggregator 730 detects a packet data corruption event in a series of frames of data transmission from a plurality of sensors. In one example, the detection employs an error correction code (ECC), for example, a linear block code, a convolutional code, a concatenated code or a capacity approaching code. In one example, the detection employs an error detection code (EDC) for example, a CRC code. In one example, the detection employs a payload count value, for example, a byte count or a bit count.

In one example, when the data corruption event occurs, the aggregator 730 drops the errored line and subsequent data lines in the frame and sends an error flag message via a user-defined (UD) packet to notify the plurality of processors of the data corruption event. In one example, an errored line occurs on the fourth sensor interface 724 is detected and the aggregator 730 sends an error message via a UD packet at the fourth input interface 734. In one example, the plurality of processors 740 generates a dummy frame for data throughput continuity.

In one example, the multiplexed data stream 739 from the output interface 736 is transported to a plurality of processors 740 (e.g., a system on a chip hardware (SOC-HW)) with a processor interface 741 connected to a first processor 742, a second processor 743, a third processor 744, and a fourth processor 745. In one example, the plurality of processors 740 is also connected to a processor memory 760 (e.g., a system on a chip software (SOC-SW)). In one example, the processor memory 760 maintains processor software (e.g., SOC software, SOC-SW). In one example, the aggregator memory 750 is connected to the processor memory 760 via a memory databus 770. In one example, the memory databus 770 may be used to transfer software messages between the aggregator memory 750 and the processor memory 760. In one example, the plurality of processors 740 is a processing unit.

In one example, when the data corruption event occurs, the plurality of processors 740 receives the error flag message and synthesizes a dummy data line with an original dimension to maintain data throughput continuity in the plurality of processors 740.

In one example, a fourth error recovery scheme in a sensor aggregation system for an image control error event in a single data packet (i.e., an errored control packet) sourced from one sensor (i.e., an errored sensor) of the plurality of sensors includes a recovery sequence for a plurality of image control errors. In one example, the plurality of image control errors includes a start of frame (SOF) packet control error, an end of frame (EOF) packet control error, a start of line (SOL) packet control error, an end of line (EOL) packet control error. In one example, SOF packets and EOF packets are mandatory in the sensor aggregation system. In one example, SOL packets and EOL packets are optional in the sensor aggregation system.

In one example, a normal control flow of control packets starts with a start of frame (SOF) packet and ends with an end of frame (EOF) packet for each frame before repeating for a next frame. In one example, the normal control flow of control packets conforms to the following sequencing: SOF, SOL, EOL, SOL, EOL, . . . , EOF. That is, in one example, between the SOF packet and the EOF packet, there is a repeating pattern of SOL packet and EOL packet for each line of the frame.

In one example, a SOF packet control error may occur if any packet is received, other than a SOF packet, after an EOF packet is received. For example, in this error scenario, an image control error flag message is generated.

In one example, a EOF packet control error may occur if a SOF packet is received without an EOF packet received after a previous SOF packet is received. For example, in this error scenario, an image control error flag message is generated.

In one example, an SOL packet control error may occur if any packet is received, other than a SOL packet or an EOF packet, after an EOL packet is received. For example, in this error scenario, an image control error flag message is generated.

In one example, a EOL packet control error may occur if any packet is received, other than an EOL packet, after a SOL packet is received. For example, in this error scenario, an image control error flag message is generated.

In one example, the image control error flag message indicates a fatal error which may cause a hardware violation in the plurality of processors if the image control error flag message is transported to the plurality of processors. In one example, disposition of the image control error requires a reset and system halt for error recovery.

In one example, a third error scenario may include a data corruption event in a single data packet from one sensor out of a plurality of sensors.

In one example, a fourth error scenario may include an image control event in a single control packet from one sensor out of a plurality of sensors. In one example, the image control event may be an image control error (e.g., EOF packet control error) from one sensor. In one example, a recovery procedure includes hardware from the aggregator informing software from the aggregator of an image control event, and next the software from the aggregator informing software in the plurality of processors of the image control event. As a result, the software in the plurality of processors responds to the image control event by resetting and halting data transmission from the plurality of sensors.

In one example, resetting is required in the plurality of processors (e.g., in an image signal processor (ISP)) to clear a corrupted data packet from transmission and to avoid a hardware violation from a subsequent data packet processing by the plurality of processors. In one example, the resetting requires a halt in a processor interface which receives the data transmission which also forces a halt in the data transmission from the plurality of sensors until the recovery procedure is complete.

In one example, the hardware violation may induce a reset procedure. In one example, the reset procedure may require a halt in a processor interface which receives the data transmission which also forces a halt in the data transmission from the plurality of sensors until the reset procedure is complete. That is, in one example, the image control error event in one sensor results in a halt in all sensors. In one example, the halt of all sensors results in a long latency (i.e., delay) during the recovery procedure since it is controlled and handled by software in the plurality of processors. In one example, long latency in an extended reality user application is undesirable (e.g., due to induced nausea or motion sickness).

Figure 8:
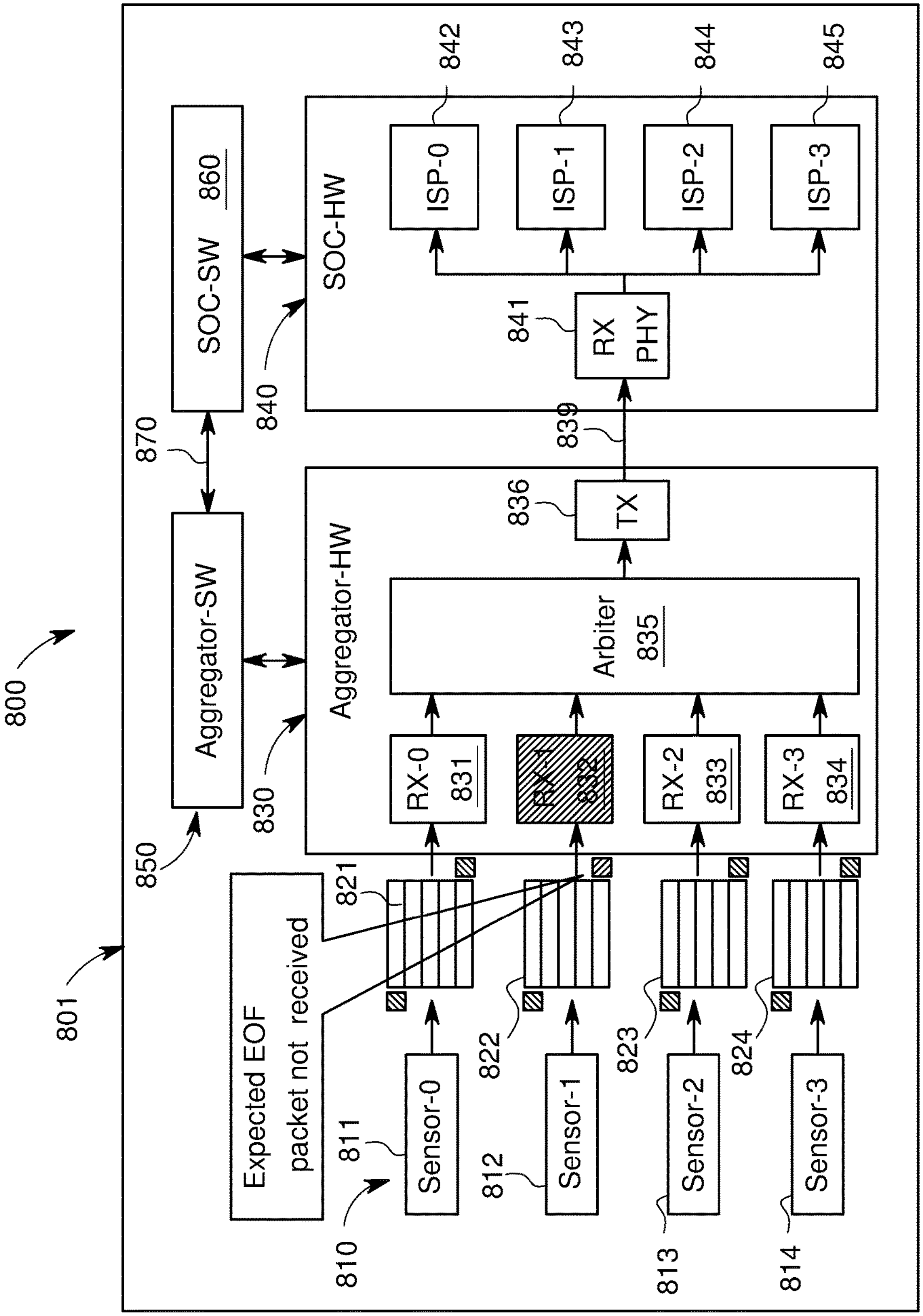
FIG. 8 illustrates an example of an image control error event in a single control packet (i.e., an errored control packet) sourced from one sensor (i.e., an errored sensor) of the plurality of sensors.

FIG. 8 illustrates an example 800 of an image control error event in a single control packet (i.e., an errored control packet) sourced from one sensor (i.e., an errored sensor) of the plurality of sensors. In one example, a sensor aggregation system 801 with a plurality of sensors 810 includes a first sensor 811 with a first sensor interface 821, a second sensor 812 with a second sensor interface 822, a third sensor 813 with a third sensor interface 823 and a fourth sensor 814 with a fourth sensor interface 824. In the example of FIG. 8, there is a data corruption event in a single control packet from the second sensor 812 which may appear in the second sensor interface 822.

In one example, an aggregator 830 (a.k.a. Aggregator-HW), which includes a first input interface (RX-0) 831, a second input interface (RX-1) 832, a third input interface (RX-2) 833 and a fourth input interface (RX-3) 834, performs multiplexing (i.e., aggregation) of data transmission from the plurality of sensors 810 using a multiplexer or arbiter 835 to produce a multiplexed data stream 839 which is sent to an output interface 836. In one example, the aggregator 830 is also connected to an aggregator memory 850 (a.k.a. Aggregator-SW). In one example, the aggregator 830 is aggregator hardware. In one example, the aggregator memory 850 maintains aggregator software.

In one example, when the data corruption event occurs, the aggregator 830 drops the errored line and subsequent data lines in the frame and sends an error flag message via a user-defined (UD) packet to notify the plurality of processors of the data corruption event.

In one example, the multiplexed data stream 839 from the output interface 836 is transported to a plurality of processors 840 (e.g., a system on a chip hardware (SOC-HW)) with a processor interface 841 connected to a first processor 842, a second processor 843, a third processor 844, and a fourth processor 845. In one example, the plurality of processors 840 is also connected to a processor memory 860 (e.g., a system on a chip software (SOC-SW)). In one example, the processor memory 860 maintains processor software (e.g., SOC software, SOC-SW). In one example, the aggregator memory 850 is connected to the processor memory 860 via a memory databus 870. In one example, the memory databus 870 may be used to transfer software messages between the aggregator memory 850 and the processor memory 860. In one example, the plurality of processors 840 is a processing unit.

In one example, when the data corruption event occurs, the aggregator 830 determines that an image control error has occurred and informs aggregator software of the presence of the image control error. In one example, the aggregator software next informs the processor software.

In one example, when the data corruption event occurs, the plurality of processors 840 receives the error flag message and synthesizes a dummy data line with an original dimension to maintain data throughput continuity in the plurality of processors 840.

In one example, a fourth error recovery scheme in a sensor aggregation system for an image control error event may include one of several procedures. In one example, a first image control error recovery procedure includes the aggregator generating a first synthesized EOF packet. In one example, the aggregator maintains tracking of a frame number which is embedded in the first synthesized EOF packet.

In one example, a second image control error recovery procedure includes the aggregator generating a first synthesized UD packet to signify the occurrence of an EOF image control error. In one example, the plurality of processors receives the first synthesized UD packet and provides an error recovery response. In one example, the error recovery response is a generation of a second synthesized EOF packet which is transported to other processors of the plurality of processors.

In one example, a third image control error recovery procedure includes the aggregator generating both a third synthesized EOF packet and a second synthesized UD packet. In one example, the plurality of processors receives the third synthesized EOF packet and transports it to other processors of the plurality of processors and uses the second synthesized UD packet to notify software to track the EOF image control error.

Figure 9:
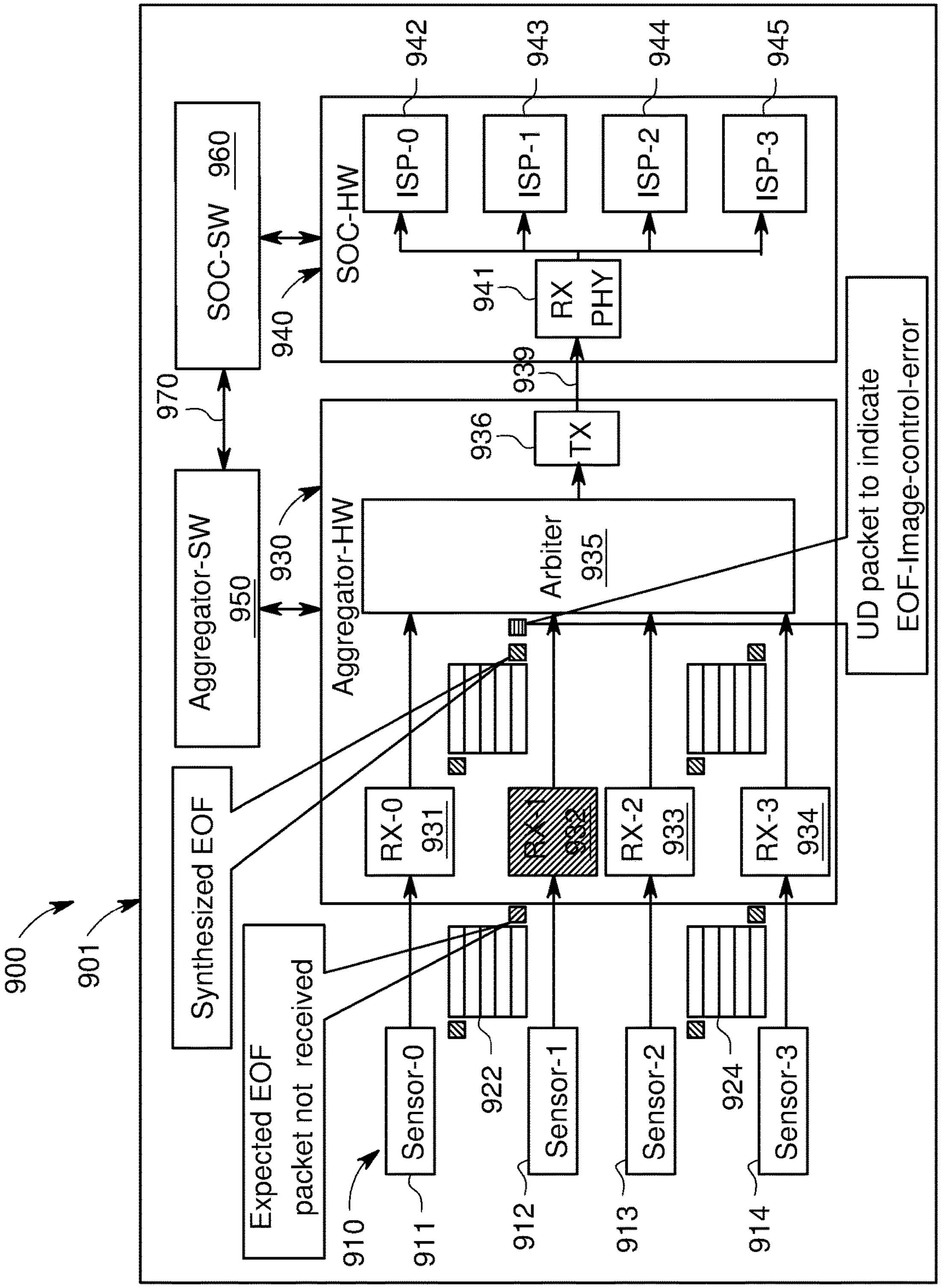
FIG. 9 illustrates an example of a fourth error recovery scheme in a sensor aggregation system.

FIG. 9 illustrates an example 900 of a fourth error recovery scheme in a sensor aggregation system 901. In one example, the sensor aggregation system 901 with a plurality of sensors 910 includes a first sensor 911 with a first sensor interface 921 (not labeled in FIG. 9), a second sensor 912 with a second sensor interface 922, a third sensor 913 with a third sensor interface 923 (not labeled in FIG. 9) and a fourth sensor 914 with a fourth sensor interface 924. In the example of FIG. 9, there is a data corruption event in a single data line from the fourth sensor 914 which may appear in the fourth sensor interface 924.

In one example, an aggregator 930 (a.k.a. Aggregator-HW), which includes a first input interface (RX 0) 931, a second input interface (RX 1) 932, a third input interface (RX 2) 933 and a fourth input interface (RX 3) 934, performs multiplexing (i.e., aggregation) of data transmission from the plurality of sensors 910 using a multiplexer or arbiter 935 to produce a multiplexed data stream 939 which is sent to an output interface 936. In one example, the aggregator 930 is also connected to an aggregator memory 950. In one example, the aggregator 930 is aggregator hardware. In one example, the aggregator memory 950 (a.k.a. Aggregator-SW) maintains aggregator software. In one example, an errored control packet, i.e., EOF packet control error, occurs on the second sensor interface 922 when an EOF packet is not received before a next SOF packet is received. In one example, aggregator 930 recovers from the errored control packet by generating a synthesized EOF packet and by creating a synthesized UD packet to signify detection of the image control error event at the second input interface 932.

In one example, when the data corruption event occurs, the aggregator 930 drops the errored line and subsequent data lines in the frame and sends an error flag message via a user-defined (UD) packet to notify the plurality of processors of the data corruption event.

In one example, the multiplexed data stream 939 from the output interface 936 is transported to a plurality of processors 940 (e.g., a system on a chip hardware (SOC-HW)) with a processor interface 941 connected to a first processor 942, a second processor 943, a third processor 944, and a fourth processor 945. In one example, the plurality of processors 940 is also connected to a processor memory 960 (e.g., a system on a chip software (SOC-SW)). In one example, the processor memory 960 maintains processor software (e.g., SOC software, SOC-SW). In one example, the aggregator memory 950 is connected to the processor memory 960 via a memory databus 970. In one example, the memory databus 970 may be used to transfer software messages between the aggregator memory 950 and the processor memory 960. In one example, the plurality of processors 940 is a processing unit.

Figure 10:
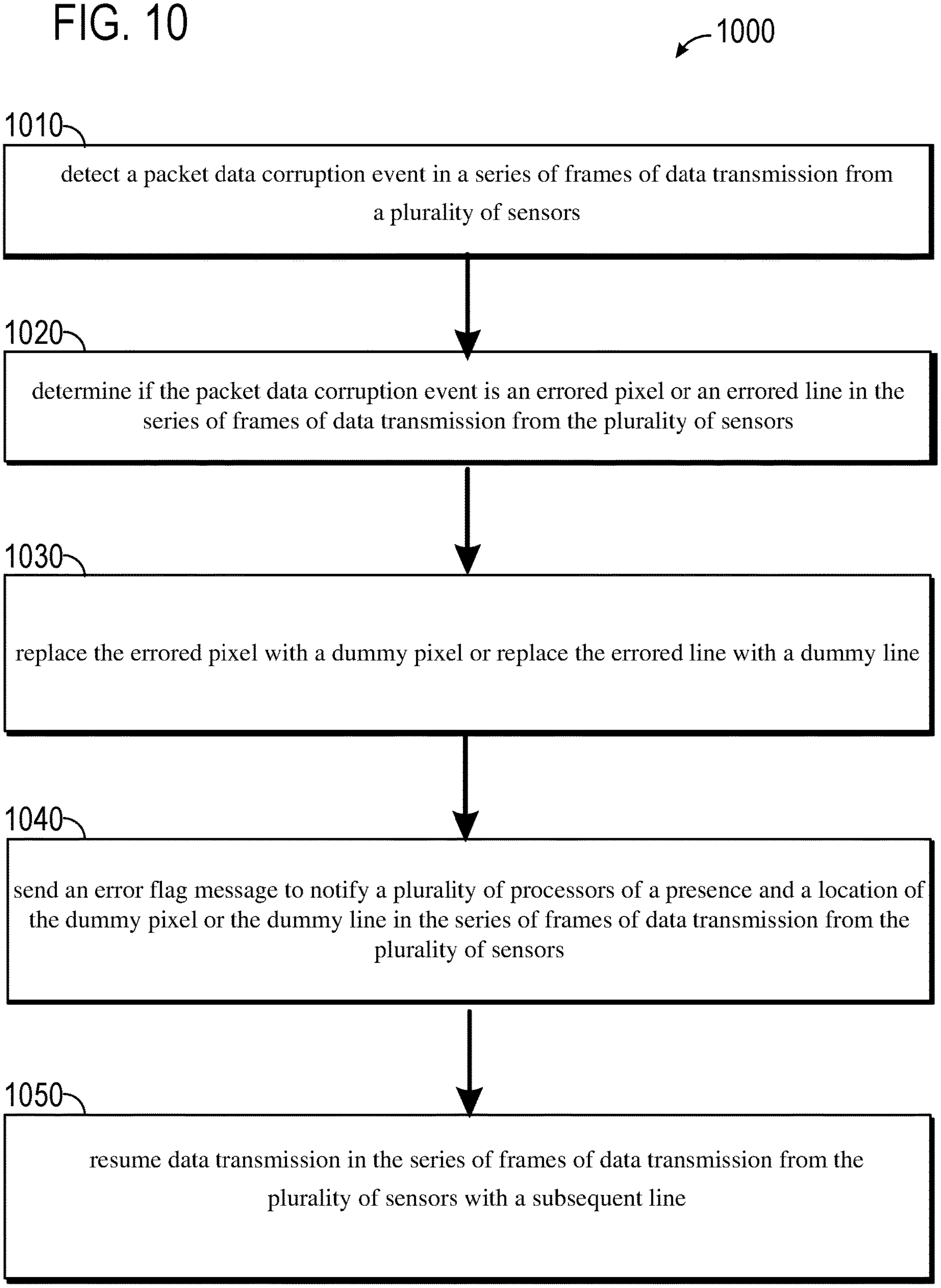
FIG. 10 illustrates an example flow diagram for error recovery from a packet data corruption event in a sensor aggregation system.

FIG. 10 illustrates an example flow diagram 1000 for error recovery from a packet data corruption event in a sensor aggregation system. In block 1010, detect a packet data corruption event in a series of frames of data transmission from a plurality of sensors. In one example, the detection is performed by aggregator hardware without software involvement. In one example, the series of frames is a series of two-dimensional pixels, where a pixel is an element of an image. In one example, the series of frames is a series of one-dimensional lines, where a line is one dimensional with a plurality of pixels and each frame is two dimensional with a sequence of lines. In one example, the packet data corruption event is an errored pixel. In one example, the packet data correction event is an errored line.

In one example, detect using an error correction code (ECC). In one example, detect using an ECC when the error correction capability of the ECC is exceeded but the error detection capability of the ECC is capable of detecting the packet data corruption event. In one example, detect using an error detection code (EDC). In one example, the EDC is a cyclic redundancy check (CRC) code. In one example, detect using the EDC when the error detection capability of the EDC is capable of detecting the packet data corruption event. In one example, detect and correct using the ECC when the error correction capability of the ECC is capable of detecting and correcting the packet data corruption event. In one example, the detect using a payload count value, for example, a byte count or a bit count.

In block 1020, determine if the packet data corruption event is an errored pixel or an errored line in the series of frames of data transmission from the plurality of sensors. In one example, the determination is performed by aggregator hardware without software involvement. In one example, the errored pixel is an errored data packet. In one example, the errored line is a plurality of errored data packets. In one example, the errored pixel is an element of an image and the errored line is one dimensional with a plurality of errored pixels within the image.

In block 1030, replace the errored pixel with a dummy pixel or replace the errored line with a dummy line. In one example, the replacement is performed by aggregator hardware without software involvement. In one example, the replacement is performed by processor hardware without software involvement. For example, the dummy pixel may have a default digital value, e.g., zero. In another example, the dummy pixel may have an arbitrary digital value, e.g., pseudorandom data. For example, the dummy line may have default digital values, e.g., all zeros. In another example, the dummy line may have arbitrary digital values, e.g., pseudorandom data.

In block 1040, send an error flag message to notify a plurality of processors of a presence and a location of the dummy pixel or the dummy line in the series of frames of data transmission from the plurality of sensors. In one example, the sending is performed by aggregator hardware without software involvement. In one example, the presence is a binary state, e.g., errored vs. non-errored. In one example, the location is a numerical index which indicates which pixel of the image is the dummy pixel or which line of the image is the dummy line. In one example, the error flag message directs the recovery of the sensor aggregation system by substituting the dummy pixel with a previous pixel, substituting a plurality of dummy pixels in a line with a previous line, substituting the dummy line with a previous line, or substituting a plurality of dummy lines in a frame with a plurality of previous lines from the frame.

In block 1050, resume data transmission in the series of frames of data transmission from the plurality of sensors with a subsequent line.

Figure 11:
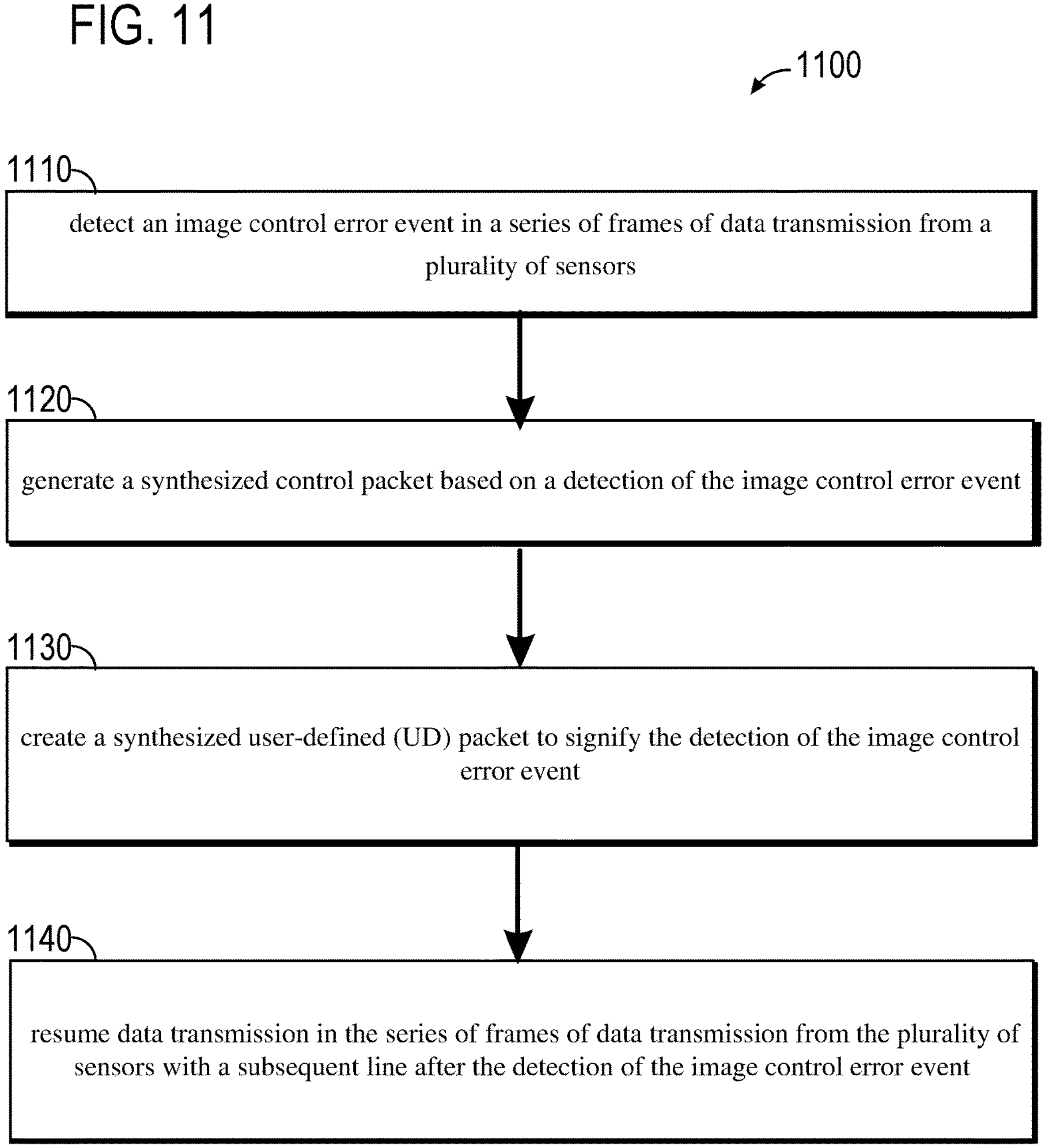
FIG. 11 illustrates an example flow diagram for error recovery from an image control error event in a sensor aggregation system.

FIG. 11 illustrates an example flow diagram 1100 for error recovery from an image control error event in a sensor aggregation system. In block 1110, detect an image control error event in a series of frames of data transmission from a plurality of sensors. In one example, the detection is performed by aggregator hardware without software involvement. In one example, the image control error is a disruption to a normal control flow of control packets which starts with a start of frame (SOF) packet and ends with an end of frame (EOF) packet for each frame before repeating for a next frame. In one example, the normal control flow of control packets includes a repeating pattern of SOL packet and EOL packet for each line of the frame. In one example, the image control error event is a SOF packet control error. In one example, the image control event is an EOF packet control error. In one example, the image control error event is a start of line (SOL) packet control error. In one example, the image control event is an end of line (EOL) packet control error.

In block 1120, generate a synthesized control packet based on a detection of the image control error event. In one example, the generation is performed by aggregator hardware without software involvement. In one example, the generation is performed by processor hardware without software involvement. In one example, the synthesized control packet is a synthesized EOF packet. In one example, the synthesized EOF packet includes a frame number. For example, the frame number is accounted by the aggregator hardware. In one example, the synthesized control packet is a synthesized SOF packet, a synthesized start of line (SOL) packet or a synthesized end of line (EOL) packet.

In block 1130, create a synthesized user-defined (UD) packet to signify the detection of the image control error event. In one example, the creation is performed by aggregator hardware without software involvement. In one example, the synthesized UD packet is used by processor hardware to provide an error recovery response. In one example, the error recovery response is a generation of a second synthesized control packet which is transported to other processors of the plurality of processors. In one example, the error recovery response is a production of a second synthesized UD packet to notify processor software to track the image control error.

In block 1140, resume data transmission in the series of frames of data transmission from the plurality of sensors with a subsequent line after the detection of the image control error event.

In one aspect, one or more of the steps for providing error recovery in FIGS. 10 & 11 may be executed by one or more processors which may include hardware, software, firmware, etc. The one or more processors, for example, may be used to execute software or firmware needed to perform the steps in the flow diagrams of FIGS. 10 & 11. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise.

The software may reside on a computer-readable medium. The computer-readable medium may be a non-transitory computer-readable medium. A non-transitory computer-readable medium includes, by way of example, a magnetic storage device (e.g., hard disk, floppy disk, magnetic strip), an optical disk (e.g., a compact disc (CD) or a digital versatile disc (DVD)), a smart card, a flash memory device (e.g., a card, a stick, or a key drive), a random access memory (RAM), a read only memory (ROM), a programmable ROM (PROM), an erasable PROM (EPROM), an electrically erasable PROM (EEPROM), a register, a removable disk, and any other suitable medium for storing software and/or instructions that may be accessed and read by a computer. The computer-readable medium may also include, by way of example, a carrier wave, a transmission line, and any other suitable medium for transmitting software and/or instructions that may be accessed and read by a computer. The computer-readable medium may reside in a processing system, external to the processing system, or distributed across multiple entities including the processing system. The computer-readable medium may be embodied in a computer program product. By way of example, a computer program product may include a computer-readable medium in packaging materials. The computer-readable medium may include software or firmware for error recovery. Those skilled in the art will recognize how best to implement the described functionality presented throughout this disclosure depending on the particular application and the overall design constraints imposed on the overall system.

Any circuitry included in the processor(s) is merely provided as an example, and other means for carrying out the described functions may be included within various aspects of the present disclosure, including but not limited to the instructions stored in the computer-readable medium, or any other suitable apparatus or means described herein, and utilizing, for example, the processes and/or algorithms described herein in relation to the example flow diagram.

Within the present disclosure, the word "exemplary" is used to mean "serving as an example, instance, or illustration." Any implementation or aspect described herein as "exemplary" is not necessarily to be construed as preferred or advantageous over other aspects of the disclosure. Likewise, the term "aspects" does not require that all aspects of the disclosure include the discussed feature, advantage or mode of operation. The term "coupled" is used herein to refer to the direct or indirect coupling between two objects. For example, if object A physically touches object B, and object B touches object C, then objects A and C may still be considered coupled to one another-even if they do not directly physically touch each other. The terms "circuit" and "circuitry" are used broadly, and intended to include both hardware implementations of electrical devices and conductors that, when connected and configured, enable the performance of the functions described in the present disclosure, without limitation as to the type of electronic circuits, as well as software implementations of information and instructions that, when executed by a processor, enable the performance of the functions described in the present disclosure.

One or more of the components, steps, features and/or functions illustrated in the figures may be rearranged and/or combined into a single component, step, feature or function or embodied in several components, steps, or functions. Additional elements, components, steps, and/or functions may also be added without departing from novel features disclosed herein. The apparatus, devices, and/or components illustrated in the figures may be configured to perform one or more of the methods, features, or steps described herein. The novel algorithms described herein may also be efficiently implemented in software and/or embedded in hardware.

It is to be understood that the specific order or hierarchy of steps in the methods disclosed is an illustration of exemplary processes. Based upon design preferences, it is understood that the specific order or hierarchy of steps in the methods may be rearranged. The accompanying method claims present elements of the various steps in a sample order, and are not meant to be limited to the specific order or hierarchy presented unless specifically recited therein.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language of the claims, wherein reference to an element in the singular is not intended to mean "one and only one" unless specifically so stated, but rather "one or more." Unless specifically stated otherwise, the term "some" refers to one or more. A phrase referring to "at least one of" a list of items refers to any combination of those items, including single members. As an example, "at least one of: a, b, or c" is intended to cover: a; b; c; a and b; a and c; b and c; and a, b and c. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112, sixth paragraph, unless the element is expressly recited using the phrase "means for" or, in the case of a method claim, the element is recited using the phrase "step for."

One skilled in the art would understand that various features of different embodiments may be combined or modified and still be within the spirit and scope of the present disclosure.

What is claimed is:

1. An apparatus for error recovery, the apparatus comprising:

a plurality of sensors configured to generate a plurality of sensor data;

a plurality of sensor interfaces, wherein each one of the plurality of sensor interfaces is coupled to each one of the plurality of sensors;

an aggregator, coupled to the plurality of sensor interfaces, the aggregator configured a) to multiplex the plurality of sensor data into a single aggregator output stream, b) to detect a transmission error due to a bit error or a bit erasure in the plurality of sensor data, c) to send an error flag message using a multiplexed data stream; wherein the aggregator uses an aggregator hardware without software involvement; and a processing unit coupled to the aggregator, the processing unit configured to recover the transmission error using a processor hardware without software involvement and to substitute an errored pixel with a dummy pixel upon receipt of the error flag message from the multiplexed data stream, wherein the dummy pixel enables an error recovery scheme for maintenance of a data packet dimension and wherein the maintenance avoids a hardware violation and avoids a reset.

2. The apparatus of claim 1, further comprising the processing unit configured to receive the single aggregator output stream and to process the plurality of sensor data.

3. The apparatus of claim 2, further comprising a processor memory coupled to the processing unit.

4. The apparatus of claim 3, further comprising an aggregator memory coupled to the aggregator.

5. The apparatus of claim 4, wherein the aggregator comprises a plurality of input interfaces configured to receive the plurality of sensor data.

6. The apparatus of claim 5, wherein the aggregator comprises a multiplexer configured to generate the single aggregator output stream.

7. The apparatus of claim 6, wherein the processor comprises a processor interface configured to receive the single aggregator output stream.

8. The apparatus of claim 7, wherein the processing unit comprises a plurality of processors wherein each of the plurality of processors is coupled to the processor interface.

9. The apparatus of claim 8, wherein each of the plurality of processors is assigned in a one-to-one correspondence with each of the plurality of sensor data.

10. The apparatus of claim 8, wherein each of the plurality of processors processes the one-to-one correspondence of each of the plurality of sensor data.

11. The apparatus of claim 10, wherein the plurality of sensor data has a one-to-one correspondence with each of the plurality of sensors.

12. A method for error recovery, the method comprising:

detecting a packet data corruption event due to a bit error or a bit erasure in a series of frames of data transmission from a plurality of sensors;

sending an error flag message on a multiplexed data stream to provide packet data corruption event notification;

determining if the packet data corruption event is an errored pixel or an errored line in the series of frames of data transmission from the plurality of sensors;

substituting an errored pixel with a dummy pixel upon receipt of the error flag message on the multiplexed data stream, wherein the dummy pixel enables an error recovery scheme for maintenance of a data packet dimension and wherein the maintenance avoids a hardware violation and avoids a reset; and wherein the error flag message is sent to notify a plurality of processors of a presence and a location of the dummy pixel or the dummy line in the series of frames of data transmission from the plurality of sensors.

13. The method of claim 12, further comprising detecting the packet data corruption event using an error correction code (ECC).

14. The method of claim 12, further comprising detecting the packet data corruption event using an error detection code (EDC).

15. The method of claim 12, further comprising detecting the packet data corruption event using a payload count value.

16. The method of claim 15, wherein the payload count value is a byte count or a bit count.

17. The method of claim 12, further comprising determining if the packet data corruption event is the errored pixel or the errored line by using an aggregator hardware without software involvement.

18. The method of claim 17, further comprising substituting the errored pixel with the dummy pixel by using a processor hardware without software involvement.

19. The method of claim 18, wherein, the errored pixel is an element of an image and the errored line is one dimensional with a plurality of errored pixels within the image.

20. The method of claim 19, wherein the location is a numerical index which indicates which pixel of the image is the dummy pixel or which line of the image is the dummy line.

21. The method of claim 20, further comprising resuming data transmission in the series of frames of data transmission from the plurality of sensors with a subsequent line.

22. A method for error recovery, the method comprising:

detecting an image control error event due to a bit error or a bit erasure in a series of frames of data transmission from a plurality of sensors;

generating a synthesized control packet based on a detection of the image control error event;

sending an error flag message on a multiplexed data stream to provide packet data corruption event notification;

substituting an errored pixel with a dummy pixel upon receipt of the error flag message on the multiplexed data stream, wherein the dummy pixel enables an error recovery scheme for maintenance of a data packet dimension and wherein the maintenance avoids a hardware violation and avoids a reset; and resuming data transmission in the series of frames of data transmission from the plurality of sensors with a subsequent line after the detection of the image control error event.

23. The method of claim 22, wherein the image control error event is a start of frame (SOF) packet control error or an end of frame (EOF) packet control error.

24. The method of claim 22, wherein the image control error event is a start of line (SOL) packet control error or an end of line (EOL) packet control error.

25. The method of claim 22, further comprising generating the synthesized control packet by using an aggregator hardware without software involvement.

26. The method of claim 22, further comprising creating a synthesized user-defined (UD) packet to signify the detection of the image control error event.

27. The method of claim 26, further comprising creating the synthesized user-defined (UD) packet by using an aggregator hardware without software involvement.

28. A non-transitory computer-readable medium storing computer executable code, operable on a device comprising at least one processor and at least one memory coupled to the at least one processor, wherein the at least one processor is configured to implement error recovery, the computer executable code comprising:

instructions for causing a computer to detect a packet data corruption event due to a bit error or a bit erasure in a series of frames of data transmission from a plurality of sensors;

instructions for causing the computer to determine if the packet data corruption event is an errored pixel or an errored line in the series of frames of data transmission from the plurality of sensors;

instructions for causing the computer to send an error flag message on a multiplexed data stream to provide packet data corruption event notification;

instructions for causing the computer to substitute an errored pixel with a dummy pixel upon receipt of the error flag message on the multiplexed data stream, wherein the dummy pixel enables an error recovery scheme for maintenance of a data packet dimension and wherein the maintenance avoids a hardware violation and avoids a reset; and instructions for causing the computer to send an error flag message to notify a plurality of processors of a presence and a location of the dummy pixel or the dummy line in the series of frames of data transmission from the plurality of sensors.

29. The non-transitory computer-readable medium of claim 28, further comprising instructions for causing the computer to determine if the packet data corruption event is the errored pixel or the errored line by using an aggregator hardware without software involvement and to substitute the errored pixel with the dummy pixel by using a processor hardware without software involvement.

30. The non-transitory computer-readable medium of claim 29, further comprising instructions for causing the computer to detect the packet data corruption event using an error correction code (ECC), an error detection code (EDC) or a payload count value.

* * * * *